Jan. 7, 1941.  K. M. WATSON  2,228,131
TREATMENT OF HYDROCARBONS
Filed Jan. 8, 1938
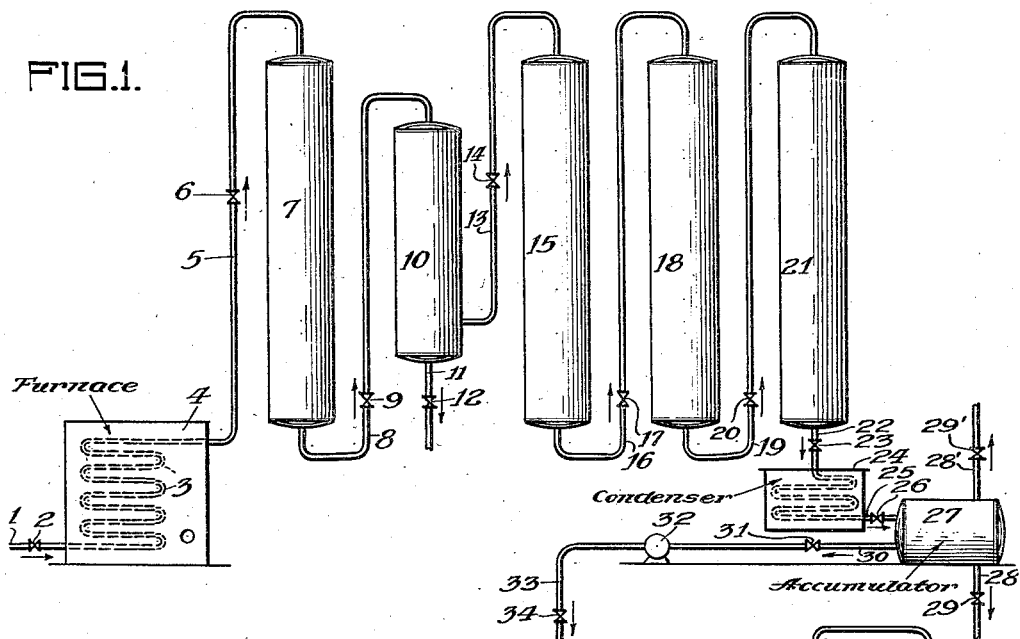
FIG.1.
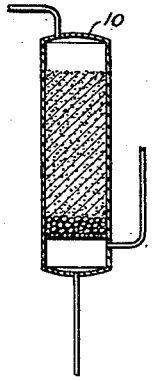
FIG.2A. Filter Separator
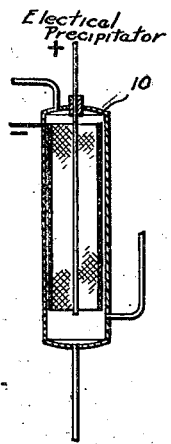
FIG.2C. Electrical Precipitator
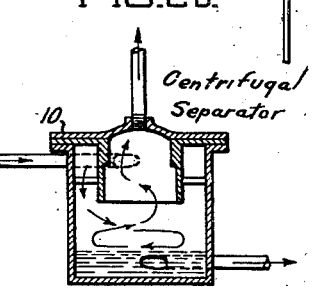
FIG.2B. Centrifugal Separator
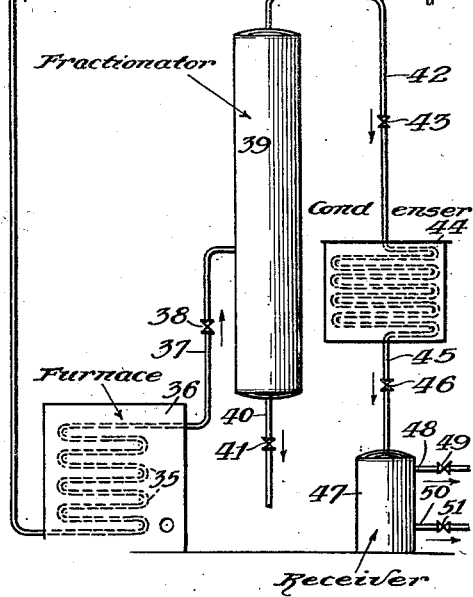
Inventor:
Kenneth M. Watson,
By: Lee J. Gary
Attorney.

Patented Jan. 7, 1941

2,228,131

UNITED STATES PATENT OFFICE 2,228,131

TREATMENT OF HYDROCARBONS

Kenneth M. Watson, Chicago, Ill., assignor to Universal Oil Products Company, Chicago, Ill., a corporation of Delaware Application January 8, 1938, Serial No. 183,987

9 Claims. (Cl. 196—10)

This invention relates particularly to processes involving the treatment of normally gaseous olefinic hydrocarbons for the polymerization thereof to produce material yields of high antiknock hydrocarbon mixtures suitable for use directly as motor fuel or as a blending agent therefor.

More specifically the invention is concerned with the use of catalytic processes for effecting the controlled polymerization of said olefins, wherein the catalysts undergo gradual deterioration on account of the deposition of carbonaceous materials on their surfaces and require periodic activation.

Recent developments in the processes employed commercially to recover motor fuel values from the waste gaseous by-products of cracking processes have involved either strictly thermal operations or the use of catalysts specific in their action which tend to favor the formation of the lower molecular weight polymers of the olefins in the cracked gases rather than polymers of higher molecular weight which have more the character of lubricating oils. Among the successful and practical catalysts which have been utilized in accomplishing these ends, the so-called "solid phosphoric acid catalysts" are outstanding. This catalytic material is manufactured by the general steps of mixing a phosphoric acid with a relatively inert carrier, preferably siliceous, heating to temperatures of the order of 300° C. or higher to drive off a portion of the water-of-composition of the acid, and "fix" a portion of the acid on the carrier, grinding and sizing to produce granules of a practical size, usually from 4 to 20 mesh, and finally treating the granules at temperatures of approximately 500° F. and atmospheric pressure to produce an acid composition most favorable to the selective polymerization of the three and four carbon atom olefinic hydrocarbons encountered in cracked gas mixtures. The procedure recounted in the preparation of the catalyst may be varied by forming the original pasty mix by extrusion or pelleting methods prior to calcining to partially dehydrate the acids and "fix" the acid in the carrier. In the preparation of catalysts of the character thus briefly described the percentage of phosphoric acid in the original mix may be varied considerably from approximately 30 to 60% by weight, with a corresponding variation in polymerizing activity. Ordinarily a major portion of acid is employed so that the acid content of the finally prepared catalyst corresponds to about 60—65% by weight of equivalent $P_2O_5$.

Solid phosphoric acid catalysts, while particularly selective and mild in their polymerizing activity in that relatively few undesirable by-products are formed during their use, nevertheless become gradually coated with carbonaceous deposits produced by what may be termed "over-polymerization" of the more reactive constituents of olefin-containing gas mixtures such as for example, dienes and isobutylene, so that their reactivation becomes imperative after a definite period of service. It is with processes aimed at prolonging the effective life of this type of catalyst that the present invention is concerned.

In ordinary commercial operations with solid phosphoric acid catalysts and other catalysts of analogous properties, it is customary to use a series of interconnected vertical cylindrical treating chambers containing stationary beds of granular catalysts; such treating towers are most frequently used in series connection although means are provided for operating in parallel if desired and for shifting the flow of gases therethrough to permit the use of the treating chambers in any desired order. It is customary to operate until one tower in a series becomes fouled and then segregate this spent catalyst chamber from the others for its reactivation which may be done by the use of relatively low oxygen content flue gases or air below a limit temperature followed by steaming as in the original preparation of the catalyst, the tower containing reactivated material being again placed in service while the catalyst in another tower is being reactivated.

In more specific embodiment the present invention comprises the use of separating chambers in connection with processes in which solid granular catalysts are employed in a series of treating chambers to polymerize normally gaseous olefins, the separating chambers being so placed that primary products of "over polymerization" are removed practically as soon as formed and do not further contact the catalyst, thereby prolonging its life and insuring continuous operations over longer periods of time.

It will be seen from the foregoing paragraph that the invention has broad application and that any specific description of an operation might have a tendency to limit its scope. However, for the purpose of more fully explaining the exact nature of the invention, it will be of advantage to describe a characteristic operation and for this purpose the attached drawing has been provided which shows in Figure 1 in general side elevation, an arrangement of apparatus in which the operation of the process may be conducted. Figure 2a indicates in section a separator containing filtering material, Figure 2b indicates partly in section and partly in elevation a characteristic type of centrifugal separator, and Figure 2c indicates partly in section and partly in elevation an electrical precipitator.

Referring to Figure 1 of the drawing, olefin-containing gases may be admitted under pressure to a polymerizing plant through a line 1 containing a valve 2 and preheated to an optimum temperature for their most effective polymerization during passage through a heating element 3 disposed to receive heat from a furnace 4. The temperature and pressure to which olefin-containing gas mixtures may be brought for accomplishing the controlled polymerization of the olefinic content will naturally vary depending upon the total olefinic content of the gas mixture, upon the character and properties of individual olefins, upon the activity of the catalytic material employed and numerous other factors. However, in a large number of commercial polymerizing plants employing granular catalysts of the variety known as "solid phosphoric acid", the temperature range may vary from approximately 350–500° F. under a pressure of approximately 100–300 lb. sq. inch or higher, since these conditions include combinations favorable to the effective polymerization of the normally gaseous olefins to produce good yields of antiknock blending fluids.

In the hook-up shown in the drawing the olefinic gas mixture passes through line 5 containing valve 6 and enters a primary catalytic chamber 7 which may represent the first of any series of chambers which may be employed. In such a primary chamber it is more or less obvious that the more reactive material such as butadienes and iso-butylene (and possibly other compounds containing oxygen and sulfur) will be rapidly polymerized or undergo other types of condensation reactions so that when average conditions are employed favorable to the general polymerization of the gaseous olefins, such materials will be "over-polymerized" and form materials which are so high-boiling that they form suspended liquid or solid particles in the gas-vapor stream. In practice, when a four tower plant with a total catalytic contact time of from approximately 80 to 100 seconds is employed, the time corresponding to appreciable and damaging mist formation has been found to be from approximately 15 to 40 seconds. Assuming a considerable mist formation in primary treater 7, the total products are passed through line 8 containing a valve 9 to a mist separator 10 to remove all substances which are not in true vapor form which may be removed through a draw-off line 11 containing a valve 12. This separator may take any of the forms shown diagrammatically in Figures 2a, 2b, and 2c already referred to or any other convenient and operative form of separator may be employed.

The partially treated gas mixture now freed of a major portion of its "over-polymerized" materials passes through line 13 containing valve 14 and in series through the other catalytic treaters represented by 15, 18, and 21, 15 and 18 being connected by line 16 containing valve 17, and 18 and 21 being connected by line 19 containing valve 20. The representation of treating chambers shown in the drawing, while typical, is entirely diagrammatic and it is obvious that other set-ups may be employed particularly as the polymerizing process proceeds and one after another of the catalyst beds become spent and in need of reactivation.

To follow the further progress of the polymerization products, they are passed through a draw line 22 containing a valve 23 and through a condenser 24 to enter an intermediate accumulator 27 by way of line 25 containing a valve 26. This accumulator is provided with a gas vent 28' containing valve 29' for the release of gas accumulations which obviously may be used as fuel in the furnaces of the process or may be further fractionated to recover recycle material adapted to further polymerizing contact or as a diluent for highly olefinic charging stocks in case the recycle stock is mainly paraffinic in character. Accumulator 27 is also provided with a bottom draw line 28 containing a valve 29 to permit the removal of water since limited amounts of steam may be admitted to the gas mixture undergoing polymerization with solid phosphoric acid catalysts to assist in preventing a rapid loss of water with consequent diminution in activity of the catalyst.

The polymers accumulating in accumulator 27 are usually fractionated to obtain a heart cut boiling within the range of motor fuel and for this purpose are taken through line 30 containing valve 31 by a pump 32 and discharged through line 33 containing valve 34 into and through a heating element 35 arranged in a furnace 36 wherein they are brought to a temperature suitable for their effective fractionation. The heated polymers then pass through line 37 containing valve 38 to a fractionator 39 which preferably is of a design and capacity permitting the separation of gasoline boiling range materials as an overhead and the removal of heavier higher boiling compounds as reflux, the latter being removed through line 40 containing valve 41 to any ultimate disposition for which they may be suited.

The overhead vapors from fractionator 39 pass through line 42 containing valve 43 through a condenser 44 which has a run-down line 45 containing a valve 46 leading to a final receiver 47 provided with a gas release line 48 containing valve 49 and a liquid draw line 50 containing valve 51 for finished product, which may if desired be subjected to further stabilizing treatment for the removal of excess light ends and the production of a proper vapor pressure product.

The following example of the beneficial effects obtained when utilizing the process of the invention is given for illustrative purposes only and not with the intent of limiting the scope of the invention in exact correspondence with the data presented.

In a polymerizing plant similar to that shown diagrammatically in the drawing, gas from the stabilizer of a cracking plant was processed with and without the use of a mist filter between the first and second catalyst towers in a series of four. The following table summarizes the important data obtained.

|  | Without mist separator | With mist separator |
|---|---|---|
| Length of run, days | 10 | 10 |
| Feed Rate, Cu. ft./hr | 22,400 | 22,900 |
| Temperature, °F | 450 | 450 |
| Total contact time, seconds | 108 | 106 |
| Plant pressure, lb./sq. in | 200 | 200 |
| Percent steam in gas | 1.8 | 1.9 |
| Higher olefin content of inlet gas | 34.1 | 34.7 |
| Higher olefin content of outlet gas | 8.3 | 5.5 |
| Percent olefin removed by polymerization | 83 | 89 |
| Gal. polymer/1,000 cu. ft. gas | 5.6 | 6.1 |
| Gain in weight of catalyst, percent: | | |
| Tower— | | |
| #1 | 9.2 | 9.2 |
| #2 | 17.4 | 1.7 |
| #3 | 4.0 | 3.0 |
| #4 | 3.0 | 2.0 |
| Spent catalyst activity, percent of original: | | |
| Tower— | | |
| #1 | 57 | 56 |
| #2 | 40 | 90 |
| #3 | 65 | 78 |
| #4 | 70 | 80 |

It will be seen from the above data that the comparison is based on two runs of similar duration. The data shows that there was a higher percent removal of polymerizable olefins from the gas mixture, a higher production of gasoline boiling range polymer per volume of gas mixture treated, a much lower gain in weight in tower #2, and also a much higher residual catalyst activity in the towers succeeding tower #1 when the mist separator was used.

I claim as my invention:

1. In the polymerization of normally gaseous olefins wherein the olefinic gas is subjected to polymerizing conditions in contact with solid polymerizing catalyst, the improvement which comprises removing the gas from contact with the catalyst after a contact time of approximately 15 to 40 seconds and separating therefrom relatively heavy polymerization products existing as a mist under the polymerizing conditions, and then continuing the contact of the gas with solid polymerizing catalyst to complete the polymerization thereof.

2. In the polymerization of normally gaseous olefins wherein the olefinic gas is subjected to polymerizing conditions in contact with solid phosphoric acid catalyst, the improvement which comprises removing the gas from contact with the catalyst after a contact time of approximately 15 to 40 seconds and separating therefrom relatively heavy polymerization products existing as a mist under the polymerizing conditions, and then continuing the contact of the gas with solid phosphoric acid catalyst to complete the polymerization thereof.

3. A process for polymerizing normally gaseous olefins which comprises subjecting the olefinic gas to polymerizing conditions in contact with a solid polymerizing catalyst for a time period of about 15 to 40 seconds, thereby developing in the gas a mist formation having a fouling action on the catalyst under polymerizing conditions, removing the gas from contact with the catalyst promptly upon the development of said mist formation therein, separating the mist from the gas while the latter is out of contact with the catalyst, and then continuing the contact of the gas with solid polymerizing catalyst to complete the polymerization thereof.

4. A process for polymerizing normally gaseous olefins which comprises contacting said olefins with a granular catalyst for a time of approximately 15 to 40 seconds and at a temperature and pressure adequate to effect the partial polymerization thereof, removing relatively heavy polymerization products existing as a mist at the temperature and pressure of treatment, and then further contacting the gas mixture with fresh portions of the granular catalyst for a further time of approximately 60–75 seconds and at a temperature and pressure adequate to substantially complete the polymerization reactions.

5. A process for polymerizing normally gaseous olefins which comprises contacting said olefins with a granular catalyst comprising essentially a precalcined mixture of a phosphoric acid and a siliceous adsorbent contained in the primary chamber of a series of separate treating chambers for a time of approximately 15-40 seconds and at a temperature and pressure adequate to effect the partial polymerization thereof, removing relatively heavy polymerization products existing as a mist at the temperature and pressure of treatment and then further contacting the gas mixture with fresh portions of the granular catalyst contained in the remaining chambers of said series for a further time of approximately 60–75 seconds and at a temperature and pressure adequate to substantially complete the polymerization reactions.

6. A process for polymerizing normally gaseous olefins which comprises contacting said olefins with a granular catalyst comprising essentially a precalcined mixture of a phosphoric acid and a siliceous adsorbent contained in the primary chamber of a series of separate treating chambers for a time of approximately 15-40 seconds and at a temperature and pressure adequate to effect the partial polymerization thereof, removing relatively heavy polymerization products existing in liquid phase at the temperature and pressure of treatment by mechanical filtration and then further contacting the gas mixture with fresh portions of the granular catalyst contained in the remaining chambers of said series for a further time of approximately 60–75 seconds and at a temperature and pressure adequate to substantially complete the polymerization reactions.

7. A process for polymerizing normally gaseous olefins which comprises contacting said olefins with a granular catalyst comprising essentially a precalcined mixture of a phosphoric acid and a siliceous adsorbent contained in the primary chamber of a series of separate treating chambers for a time of approximately 15-40 seconds and at a temperature and pressure adequate to effect the partial polymerization thereof, removing relatively heavy polymerization products existing in liquid phase at the temperature and pressure of treatment by centrifugal separation and then further contacting the gas mixture with fresh portions of the granular catalyst contained in the remaining chambers of said series for a further time of approximately 60–75 seconds and at a temperature and pressure adequate to substantially complete the polymerization reactions.

8. A process for polymerizing normally gaseous olefins which comprises contacting said olefins with a granular catalyst comprising essentially a precalcined mixture of a phosphoric acid and a siliceous adsorbent contained in the primary chamber of a series of separate treating chambers for a time of approximately 15-40 seconds and at a temperature and pressure adequate to effect the partial polymerization thereof, removing relatively heavy polymerization products existing in liquid phase at the temperature and pressure of treatment by electrical precipitation and then further contacting the gas mixture with fresh portions of the granular catalyst contained in the remaining chambers of said series for a further time of approximately 60–75 seconds and at a temperature and pressure adequate to substantially complete the polymerization reactions.

9. A process for polymerizing normally gaseous olefins which comprises contacting said olefins with a granular catalyst comprising essentially a precalcined mixture of a phosphoric acid and a siliceous adsorbent contained in the primary chamber of a series of separate treating chambers operating at temperatures of the order of 350–500° F. and pressures of approximately 100–300 lb. per square inch for a time of approximately 15–40 seconds to effect the partial polymerization thereof, treating the gas mixture to remove relatively heavy polymerization products existing as a mist at the temperature and pressure of treatment and then contacting the gas mixture with fresh portions of the granular catalyst contained in the remaining chambers of said series for a further time of approximately 60–75 seconds and at a temperature and pressure adequate to substantially complete the polymerization reactions.

KENNETH M. WATSON.